UNITED STATES PATENT OFFICE.

BENJAMIN W. HAIR, OF MILLVILLE, OHIO.

IMPROVEMENT IN MEDICAL COMPOUNDS.

Specification forming part of Letters Patent No. 219,396, dated September 9, 1879; application filed October 12, 1878.

*To all whom it may concern:*

Be it known that I, BENJAMIN W. HAIR, of Millville, in the county of Butler and State of Ohio, have invented a new and useful Compound Medicine for the Cure of Asthma, which compound is fully described in the following specification.

This invention consists in a composition formed by mixing the following ingredients, in the proportions substantially as and in the manner hereinafter specified, namely: one-half an ounce iodide potassium; one-fourth of an ounce bromide potassium; one-half an ounce gum-arabic; one-half an ounce fluid extract of buchu; one dram each of tincture of lobelia, Fowler's solution of arsenic, tincture of gum-guaiacum, and six ounces of fluid extract of pine-tar.

To obtain the fluid extract of pine-tar, boil one quart of pine-tar with four quarts of water, until the water is reduced one-half; then filter the water and add one-half pint of alcohol.

The gum-arabic, iodide and bromide of potassium, in granular form, are added after the other parts are mixed and dissolved therein.

I have proven by experience and in my practice as a physician that this compound is a reliable remedy for asthma, and effects a permanent cure.

The medicine is to be administered in doses of one tea-spoonful at intervals of every four hours.

Each of the ingredients must be of good quality and of ordinary strength, such as are to be purchased in reputable drug-stores.

I am aware that iodide of potassium, bromide of potassium, tincture of lobelia, and arsenic have been used for the relief of asthma, and therefore I do not claim these articles, either separately or in combination; but, Having described my invention, I claim—

The composition consisting of iodide of potassium, bromide of potassium, gum-arabic, fluid extract of buchu, tincture of lobelia, Fowler's solution of arsenic, tincture of gum-guaiacum, and fluid extract of pine-tar, in proportions specified, substantially as and for the purpose described.

Witness my hand this 5th day of October, A. D. 1878.

B. W. HAIR.

Witnesses:
WM. GHOLSON MINER,
H. P. K. PECK.